United States Patent
Olszewski

(10) Patent No.: US 8,375,994 B2
(45) Date of Patent: Feb. 19, 2013

(54) VALVE FOR ELECTRONIC ENCLOSURE

(75) Inventor: Jason R. Olszewski, Eden Prairie, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 870 days.

(21) Appl. No.: 11/746,636

(22) Filed: May 9, 2007

(65) Prior Publication Data

US 2007/0289971 A1 Dec. 20, 2007

Related U.S. Application Data

(60) Provisional application No. 60/746,889, filed on May 9, 2006.

(51) Int. Cl.
*F16K 15/14* (2006.01)

(52) U.S. Cl. ............... 137/845; 137/512.15; 137/516.11

(58) Field of Classification Search .................. 137/843, 137/844, 854, 516.11–516.25, 512–512.2, 137/512.15, 845; 360/97.02
See application file for complete search history.

(56) References Cited

U.S. PATENT DOCUMENTS

| | | | |
|---|---|---|---|
| 1,799,103 A * | 3/1931 | Klimek | 137/516.11 |
| 4,389,687 A | 6/1983 | Gorove | |
| 4,526,195 A * | 7/1985 | Humphrey et al. | 137/512.1 |
| 4,620,248 A | 10/1986 | Gitzendanner | |
| 5,454,157 A | 10/1995 | Ananth et al. | |
| 6,205,845 B1 | 3/2001 | Dinsmore et al. | |
| 6,317,286 B1 | 11/2001 | Murphy et al. | |
| 6,392,838 B1 | 5/2002 | Hearn et al. | |
| 6,560,064 B1 | 5/2003 | Hirano | |
| 6,575,192 B1 * | 6/2003 | Shaffer | 137/514.5 |
| 6,683,746 B1 * | 1/2004 | Kuroki et al. | 360/97.02 |
| 6,831,811 B1 | 12/2004 | Andrikowich et al. | |

OTHER PUBLICATIONS

U.S. Appl. No. 60/746,889, "Valve for Electronic Enclosure," pp. 1-18, First named inventor: Jason Olszewski.

\* cited by examiner

*Primary Examiner* — Kevin Lee
*Assistant Examiner* — Macade Brown
(74) *Attorney, Agent, or Firm* — Pauly, DeVries Smith & Deffner, L.L.C.

(57) ABSTRACT

A one-way fill valve for use in electronic enclosures is disclosed. The one-way fill valve allows an inert gas to be added to an electronic enclosure without contamination and without excessive leakage. Generally the one-way fill valve includes a membrane layer and a valve layer that restricts flow of gas in one direction but provides significantly less restriction in another direction.

14 Claims, 2 Drawing Sheets

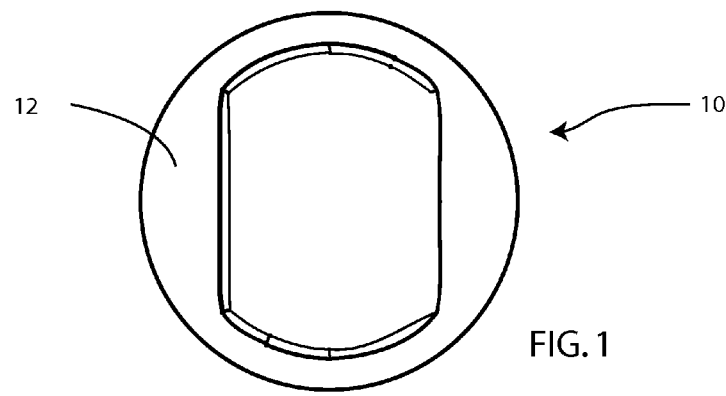
FIG. 1
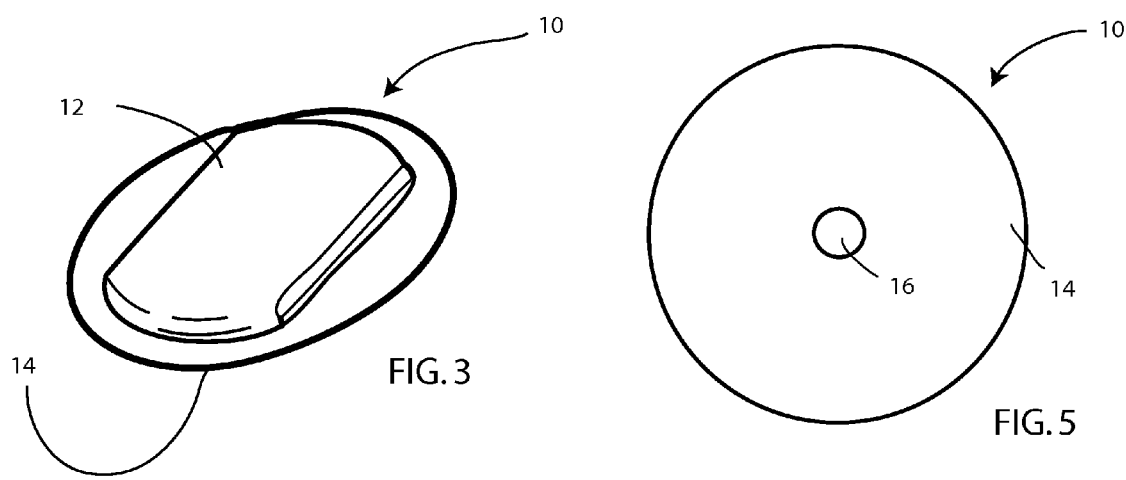
FIG. 3
FIG. 5
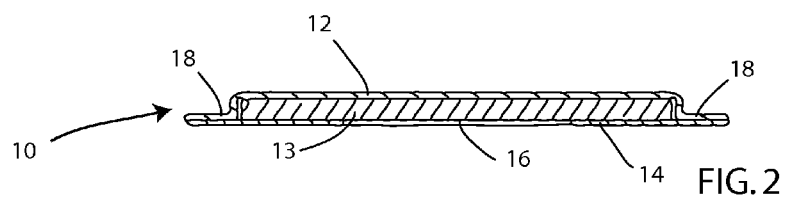
FIG. 2
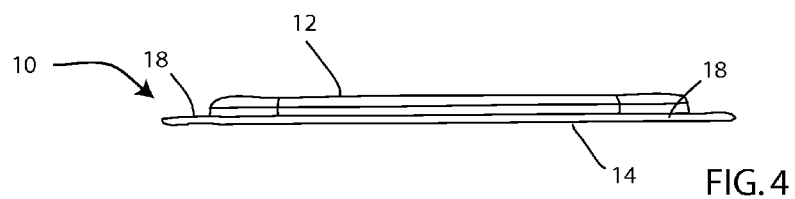
FIG. 4

VALVE FOR ELECTRONIC ENCLOSURE

PRIORITY

This application claims the benefit of U.S. Provisional Patent Application Ser. No. 60/746,889 entitled "Valve for Electronic Enclosure", filed May 9, 2006, which application is hereby incorporated by reference in its entirety.

FIELD OF THE INVENTION

The present invention is directed to a valve for an electronic enclosure. In particular, the invention is directed to valves for use in disk drives and similar devices.

BACKGROUND

Hard disk drives and other electronic equipment are often sealed within enclosures to provide a clean environment that is necessary for optimal operation of the equipment. For example, hard disk drives normally contain at least one inflexible platter or disk coated with magnetic material that is positioned within an enclosure. The disk is rapidly spun and a magnetic read/write head "flies" a few microns above it in order to access or store data. The magnetic head rides on an air cushion, and it is desirable to position the head as close as possible to the disk without touching it in order to provide a high capacity drive.

Contaminants, including particles, gases, and liquids within the hard disk drive enclosure can act to reduce the efficiency and longevity of the hard drive. These contaminants can gradually damage the drive, cause deterioration in performance, and in certain situations even cause sudden, complete failure of the drive. Contaminants often enter the electronic enclosure from an external source, especially when the disk drive is subject to extreme environments, such as those used within portable music players. Common sources of contaminants in disk drives include leaks, which may or may not be intentional.

One particular concern regarding electronic enclosures is that contaminants from outside of the electronic enclosure should be prevented from entering the enclosure. These contaminants can be of particular significance because temperature fluctuations in the enclosure will often cause the exchange of air with the exterior environment. In recent years attention has been drawn to the possibility of sealing disk drive electronic enclosures so as to prevent the flow of gases into and out of the enclosure, and further inclusion of an inert gas (such as helium) within the enclosure. However, filling an electronic enclosure with an inert gas can be difficult without inadvertently adding contaminating gases or without leakage of the inert gas out of the enclosure. Therefore, a need exists for improved methods and materials for controlling the flow of gases into and out of an electronic enclosure.

SUMMARY OF THE INVENTION

The present invention is directed to an assembly for use with an electronic enclosure, such as a hard disk drive enclosure containing a rotating disk. The present invention relates, in part, to a valve for an electronic enclosure or other controlled volume that is to be filled with an inert gas, such as hydrogen. The valve can be used to provide a temporary seal preventing the escape of the inert gas from the enclosure. In one implementation the valve is used to retain the inert gas while a more permanent seal is installed. For example, valve can create a temporary seal while a more permanent seal, such a welded or glued cover is installed over the top of temporary seals.

The invention is directed, in one implementation, to a one-way valve for use in an electronic enclosure. The valve comprises a substantially gas impermeable film and a porous film covering the gas impermeable film. The substantially gas impermeable film prevents the flow of gas in a first direction but readily allows the flow of gas in the opposite direction. In certain such implementations the gas impermeable film comprises PET, and in some implementations the porous film comprises expanded polyethylene terepthalate (ePTFE). Typically the one-way valve further comprises an adhesive layer.

In some embodiments the one-way valve further comprises an elastomeric layer intermediate the substantially gas impermeable film and the porous film, and can include an adsorbent intermediate the substantially gas impermeable film and the porous film.

Another embodiment of the invention is directed to a fill valve for use in filling an electronic enclosure with an inert gas, the valve comprising a first substantially gas impermeable film having a first surface and a second surface, said first substantially impermeable film comprising a first hole between the first surface and the second surface; a second substantially gas impermeable film having a first surface and a second surface, said second substantially impermeable film comprising a second hole between the first surface and the second surface; and a porous film covering the first and second substantially gas impermeable films. The first and second holes in the first and second substantially gas impermeable films do not overlap. Upon creation of a pressure differential in a first direction across the valve, fluid communication occurs between the first and second holes. Upon creation of an opposite pressure differential in a second direction across the valve, fluid communication does not substantially occur between the first and second holes. Thus, the valve can be used to keep an inert gas within an enclosure while the enclosure is being filled with the inert gas, and can also be used as a purge valve (when installed to permit gases to leave the enclosure) to allow the escape of undesirable gases. In some implementations two or more valves can be used: one as a fill valve allowing gas into the enclosure and one as a purge valve to allow gas to escape but not re-enter. In such embodiments excess gas is purged out of the drive as part of the fill process. Generally multiple volumes of gas can be purged through the drive enclosure to allow a high purity of the inert gas.

In some such embodiments the substantially gas impermeable films comprise PET and the porous film comprises expanded polyethylene terepthalate. Generally the valve further comprises an adhesive layer for connecting the valve to a wall of an electronic enclosure. It will be appreciated that the valve can be constructed so as to be installed either on the interior or the exterior of the electronic enclosure. An elastomeric layer can be positioned intermediate the second substantially gas impermeable film and the porous film, the elastomeric layer helping to preserve the shape of the gas impermeable films and providing a force to close the valve when no pressure differential is present.

An alternative embodiment is directed to a fill valve for use in filling an electronic enclosure with an inert gas, the valve comprising a first substantially gas impermeable film having a first surface and a second surface, said first substantially impermeable film comprising a plurality of holes between the first surface and the second surface; a second substantially gas impermeable film, said film being less flexible than first gas impermeable film, and said film having a first surface and a second surface, said second substantially impermeable film comprising a plurality of holes between the first surface and the second surface. The first film is, in some embodiments, made of the same material as the second film, but substantially thinner. For example, in some implementations the first film is less than half the thickness of the second film. A porous film covers the first and second substantially gas impermeable films. The first and second plurality holes in said first and second substantially gas impermeable films do not overlap. Upon creation of a pressure differential in a first direction across the valve fluid, communication occurs between the first and second plurality of holes, but upon creation of an opposite pressure differential in a second direction across the valve fluid communication does not substantially occur between the first and second plurality of holes.

The above summary of the present invention is not intended to describe each discussed embodiment of the present invention. This is the purpose of the figures and the detailed description that follows.

FIGURES

The invention may be more completely understood in connection with the following drawings, in which:

FIG. 1 is a top view of a fill valve in accordance with an embodiment of the invention.

FIG. 2 is a cross-sectional view of the fill valve of FIG. 1.

FIG. 3 is a perspective view of the fill valve of FIG. 1.

FIG. 4 is a side elevational view of the fill valve of FIG. 1.

FIG. 5 is a bottom plan view of the fill valve of FIG. 1.

Figure 6:
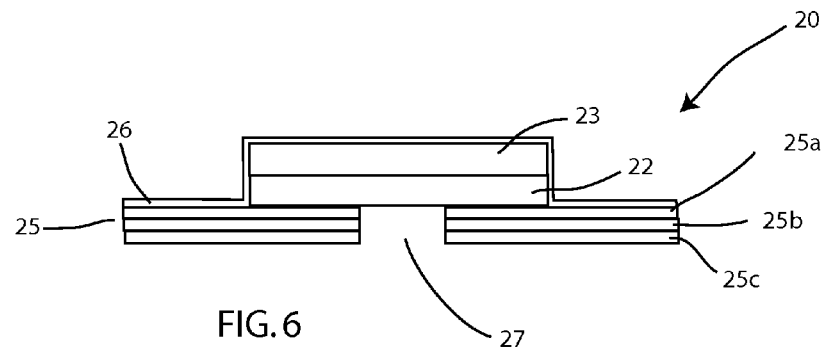

FIG. 6 a cross sectional view of an alternative fill valve made in accordance with an implementation of the invention.

Figure 7A:
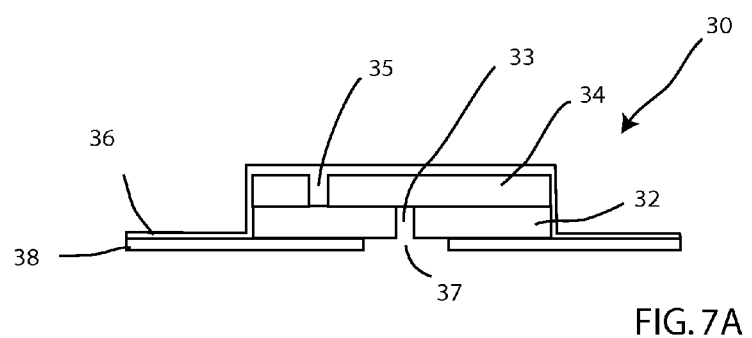

FIG. 7A is a cross sectional view of an alternative fill valve made in accordance with an implementation of the invention.

Figure 7B:
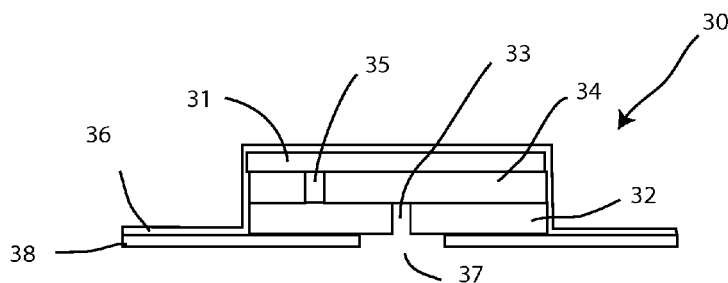

FIG. 7B is a cross sectional view of an alternative fill valve made in accordance with an implementation of the invention.

Figure 8:
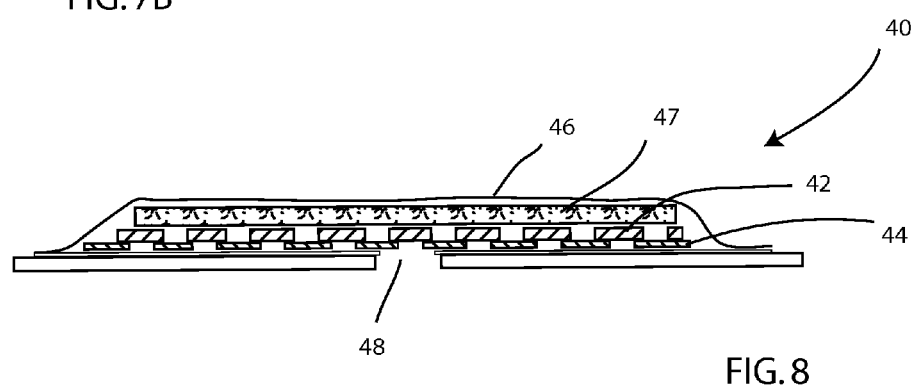

FIG. 8 a cross sectional view of an alternative fill valve made in accordance with an implementation of the invention.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The invention is directed, in one implementation, to a one-way valve for use in an electronic enclosure. The valve comprises a substantially gas impermeable film configured to move in a first direction and a porous film covering the gas impermeable film. The substantially gas impermeable film prevents the flow of gas in a first direction but readily allows the flow of gas in the opposite direction. In certain such implementations the gas impermeable film comprises polyethylene terephthalate (PET), although other films can be used, and in some implementations the porous film comprises expanded polyethylene terepthalate, although other films can be used. Typically the one-way valve further comprises an adhesive layer. In some embodiments the one-way valve further comprises an elastomeric layer intermediate the substantially gas impermeable film and the porous film, and can include an adsorbent intermediate the substantially gas impermeable film and the porous film.

Another embodiment of the invention is directed to a fill valve for use in filling an electronic enclosure with an inert gas, the valve comprising a first substantially gas impermeable film having a first surface and a second surface, said first substantially impermeable film comprising a first hole between the first surface and the second surface; a second substantially gas impermeable film having a first surface and a second surface, said second substantially impermeable film comprising a second hole between the first surface and the second surface; and a porous film covering the first and second substantially gas impermeable films. The first and second holes in the first and second substantially gas impermeable films do not overlap. Fluid communication occurs between the first and second holes upon creation of a pressure differential in a first direction across the valve, but upon creation of an opposite pressure differential in a second direction across the valve, fluid communication does not substantially occur between the first and second holes.

In some such embodiments the substantially gas impermeable films comprises PET and the porous film comprises expanded polyethylene terepthalate. Generally the valve further comprises an adhesive layer for connecting the valve to a wall of an electronic enclosure. An elastomeric layer can be positioned intermediate the second substantially gas impermeable film and the porous film, the elastomeric layer preserving the shape of the gas impermeable films and providing a force to close the valve when no pressure differential is present.

An alternative embodiment is directed to a valve for use in filling an electronic enclosure with an inert gas, the valve comprising a first substantially gas impermeable film having a first surface and a second surface. This first substantially impermeable film comprising a plurality of holes between the first surface and the second surface.

The valve also includes a second substantially gas impermeable film, said film being less flexible than first gas impermeable film, and said film having a first surface and a second surface. The second substantially impermeable film contains a plurality of holes between the first surface and the second surface; and a porous film covers the first and second substantially gas impermeable film. The first and second plurality holes do not overlap so that creation of a pressure differential in a first direction across the valve fluid allows communication occurs between the first and second plurality of holes, but creation of an opposite pressure differential across the valve fluid communication does not substantially occur between the first and second plurality of holes.

Referring now to the figures, an embodiment of the invention is described in detail with reference to the drawings, wherein like reference numbers represent like parts and assemblies throughout the several views. The terms "adsorb", "adsorbing", "adsorbent", and the like are to be understood to encompass both adsorption and absorption phenomena and materials.

FIGS. 1 to 5 show various views of a first embodiment of a valve 10 made in accordance with an implementation of the present invention. The valve 10 of includes a top 12 and a bottom 14. The bottom 14 typically includes an adhesive material, which is often an adhesive sheet, such as an acrylic adhesive. The interior (shown in FIG. 2) of the valve 10 includes a movable sealing element 13, optionally made out of polyethylene terephthalate (PET). A breathable layer 12 is typically a breathable membrane material, such as an expanded polytetrafluoroethylene film (PTFE). Edges 18 of the valve 10 of the depicted embodiment are sealed together, such as by thermal welding so as to contain the sealing element 13 and breathable layer 12.

Valve 10 further includes an opening 16 in the bottom 14. The opening 16 allows air or other gases to travel through the valve from in a direction proceeding from opening 16, around sealing element 13, and then through breathable layer 12. In operation the valve 10 can be installed on the wall of an electronic enclosure (typically the interior of the enclosure) over a port or fill-hole in the enclosure. Gas is able to readily pass through the valve in a one-way direction from the bottom 14 toward the breathable layer 12, but does not readily pass in the opposite direction. Also, the gas is readily filtered by the breathable membrane material to remove any contaminants in the gas stream. In addition, an adsorbent layer can be included between the breathable layer 12 and the sealing element 13.

Thus, in a typical embodiment, when valve 10 is placed on the interior of an electronic enclosure a fill gas can pass through the valve 10 and enter the enclosure, but the fill gas does not readily escape from the enclosure. It will be noted that in some alternate implementations the valve 10 can be installed on the outside of an electronic enclosure so as to function as a purge valve that will allow excess gas out of the enclosure, but does not readily allow contaminants (such as a non-inert gas) back into the enclosure. In some implementations the fill valve 10 of the invention can be used for both applications. Typically when an inert gas is being installed in an electronic enclosure a permanent seal is subsequently placed over the fill valve or valves. This is because many inert gases, especially helium, have molecules that are so small that an extremely tight seal must be formed. The valves of the present invention allow the purity of the gases within the electronic enclosure to be preserved until the permanent seal is installed over the top of the valves (such as, for example, by welding). Note, in many such implementations it is desirable to have an adsorbent within the fill valve or valves, because such adsorbent can remove any contaminants encapsulated by the permanent seal or generated by placement of the permanent seal (such as, for example, adhesive residue or welding byproducts). Adsorbent can prevent such contaminants from subsequently entering into the enclosure.

The assembly can also have additional layers or fewer layers, as desired, and the layers can be different on the top and bottom.

In reference now to FIG. 6, an alternative embodiment is depicted in which the fill valve 20 includes a substantially impermeable layer 22 along with an elastomeric layer 23, all covered by a breathable film 26. The fill valve 20 further includes a multilayer mounting portion 25 (in this depicted embodiment) that allows to the valve to be mounted on the wall of an electronic enclosure. The mounting portion can include, for example, a base layer of non-adhesive film 25a, an adhesive layer 25b, and a removable carrier layer 25c. An opening 27 in the valve 20 provides a conduit through which gases may pass. The elastomeric layer 23 provides a force against the impermeable layer 22 so that gases can readily pass only in the direction from the opening, around the impermeable layer 22, and then through the breathable film 26. Flow in the opposite direction is significantly reduced or eliminated because the pressure of the elastomeric layer 23 forms a seal between the impermeable layer 22 and the non-adhesive film 25a.

An alternative design is shown in FIG. 7A, which shows a valve 30 have in first and second impermeable layers 32, 34. The impermeable layers 32, 34 have non-aligned openings 33, 35. A breathable layer 36 covers the two impermeable layers 33, 34. A base layer 38 (typically having one or more sub-layers, including adhesive and non-adhesive sub-layers) is also depicted. This base layer 38 includes an opening 37 providing access to the opening 35 in the first impermeable layer 32. Upon creation of a high relative pressure on the opening 35 side of the valve 30, gases can flow through the first opening 33, between the layers 32, 34, and then through opening 35 in the second impermeable layer 34. From there the gas can pass through breathable layer 36. However, in contrast, gases do not readily flow in the opposite direction. FIG. 7B shows the same elements as FIG. 7A, but also shows an elastomeric layer 31 intermediate gas impermeable layer 34 and a porous breathable layer 36.

Yet another alternative embodiment is shown in FIG. 8, which depicts a valve 40 with two flexible, substantially impermeable layers 42, 44 having a plurality of holes through them (the holes not in alignment between the layers). In this embodiment, an adsorbent layer 47 is also depicted, along with a breathable layer 46. Gases can readily pass in the direction from opening 48 through the valve and then out the breathable layer 46. However, gases do not readily flow in the opposite direction.

In the embodiments discussed above, the adhesive layer may be, for example, a coating of an adhesive material on the housing or a double-sided adhesive tape (e.g., an adhesive carrier, such as a polymer film, with adhesive coated on two opposing surfaces). An opening may be formed in the adhesive layer, particularly if the adhesive layer is a double-sided adhesive tape, to permit fluid flow into the inlet opening and/or to fit around the extension. When a release liner is used, it is typically a film, for example, a polymer film, which can be removed from the adhesive layer leaving most, and, preferably, all, of the adhesive layer disposed on the housing. The release liner may extend beyond the adhesive layer to allow for easy removal.

In some embodiments each assembly contains at least one particulate removal or filtration layer. The particulate removal layer can include, for example, electrostatic filter media. In certain embodiments a polymeric scrim may surround the adsorbent elements and function as the particulate filter. However, in general the polymeric scrim is used in addition to the particulate filter, such as the electrostatic filter media. The particulate removal layer typically includes a porous polymer film made from, for example, polyethylene, polypropylene, polytetrafluoroethylene, modacrylic, or expanded polytetrafluoroethylene. The particulate removal layer generally prevents particulate material from entering or exiting the interior of the electronic enclosure. The particulate removal layer can be made of any material commonly available for particulate filtration, and can have any thickness that provides suitable air flow values and particulate removal. Preferably, the thickness of each layer is normally between about 0.1 to 5 mm, more typically between about 0.15 to 1.0 mm, and can be between about 0.20 to 0.25 mm.

Advantageous particulate removal layers include those made of an electrostatic medium, or a polymer medium such as Teflon. A suitable electrostatic medium, for example, is a mixed fiber medium of 50% polypropylene and 50% modacrylic that exhibits a permanent electrical potential, having a Fomblin Efficiency of 76-94% average with no single value below 71 or above 99 (test at 10.5 ft./min. airflow, 0.3-0.4 micron particles); permeability of 200-476 ft./min.; thickness of 0.036-0.061 inches; and basis weight equivalent to 30-150 gm/m.sup.2 (48-75 lbs./3000 ft.sup.2). An exemplary polymer medium is a Teflon fibrous membrane filter medium having a Fomblin Efficiency of 98.0% minimum (challenge solution is 50% Fomblin in Freon); a Frazier Permeability of 15.0 ft./min minimum average (all readings greater than 11.0 ft./min.); and a tensile strength of less than 7000 psi average over 5 samples.

As noted above in some implementations the assembly includes an adsorptive element, typically a chemical adsorptive material containing carbon. Thus, at least a portion of the material can have adsorbent properties. The adsorbent material can include physisorbents and/or chemisorbents, such as desiccants (i.e., materials that adsorb or absorb water or water vapor) and/or materials that adsorb volatile organic compounds and/or acid gas. Acid gases can be generated inside an electronic enclosure, thus it is desirable to include an organic vapor removal layer impregnated with a chemical which provides enhanced acid gas removal. Exemplary chemicals which can be used to evaluate an impregnants ability to remove acid gas include hydrogen sulfide ($H_2S$), hydrochloric acid (HCl), chlorine gas ($Cl_2$), and the like.

Suitable adsorptive materials include, for example, activated carbon, activated alumina, molecular sieves, silica gel, potassium permanganate, calcium carbonate, potassium carbonate, sodium carbonate, calcium sulfate, or mixtures thereof. The adsorbent material may adsorb one or more types of contaminants, including, for example, water, water vapor, acid gas, and volatile organic compounds. Although the adsorbent material may be a single material, mixtures of materials are also useful. For typical operation, an adsorbent material that is stable and adsorbs within a temperature range of −40° C. to 100° C. is preferred.

It will be appreciated that, although the implementation of the invention described above is directed to a hard drive enclosure, the present device may be used with other electronic enclosures, and is not limited to hard drive enclosures. In addition, while the present invention has been described with reference to several particular implementations, those skilled in the art will recognize that many changes may be made hereto without departing from the spirit and scope of the present invention.

I claim:

1. A one-way valve for use in an electronic enclosure, the valve comprising:
   a first flexible substantially gas impermeable film configured to move in a first direction, said film having a first surface and a second surface, said first substantially impermeable film comprising a plurality of holes between the first surface and the second surface;
   a second flexible substantially gas impermeable film, said film having a first surface and a second surface, said second substantially impermeable film comprising a plurality of holes between the first surface and the second surface, the holes in the second film positioned so as to be offset from the plurality of holes in the first substantially gas impermeable film;
   a porous film comprising polyethylene terephthalate covering the first and second substantially gas impermeable films;
   wherein the flexible substantially gas impermeable films substantially prevents the flow of gas in a first direction but readily allows the flow of gas in the opposite direction by allowing gas to flow through the plurality of holes in the first and second substantially gas impermeable films and through the porous film covering the first and second gas impermeable films.

2. The one-way valve of claim 1, wherein the substantially gas impermeable films comprises PET.

3. The one-way valve of claim 1, further comprising an adhesive layer.

4. The one-way valve of claim 1, further comprising an elastomeric layer intermediate the substantially gas impermeable film and the porous film.

5. The one-way valve of claim 1, further comprising an adsorbent intermediate the substantially gas impermeable film and the porous film.

6. A fill valve for use in filling an electronic enclosure with an inert gas, the valve comprising:
   a first flexible substantially gas impermeable film having a first surface and a second surface, said first substantially impermeable film comprising a first hole between the first surface and the second surface;
   a second flexible substantially gas impermeable film having a first surface and a second surface, said second substantially impermeable film comprising a second hole between the first surface and the second surface; and
   a porous film covering the first and second substantially gas impermeable films;
   wherein said first and second holes in said first and second substantially gas impermeable films do not overlap; and
   wherein upon creation of a pressure differential in a first direction across the valve fluid communication occurs between the first and second holes and through the porous film covering the first and second substantially gas impermeable films, but wherein upon creation of an opposite pressure differential in a second direction across the valve, fluid communication does not substantially occur between the first and second holes.

7. The one-way valve of claim 6, wherein at least one of the substantially gas impermeable films comprises PET.

8. The one-way valve of claim 6, wherein the porous film comprises expanded polyethylene terephthalate.

9. The one-way valve of claim 6, further comprising an adhesive layer for connecting the valve to a wall of an electronic enclosure.

10. The one-way valve of claim 6, further comprising an elastomeric layer intermediate the second substantially gas impermeable film and the porous film.

11. The one-way valve of claim 6, further comprising an adsorbent intermediate at least one of the substantially gas impermeable films and the porous film.

12. A fill valve for use in filling an electronic enclosure with an inert gas, the valve comprising:
   a first substantially gas impermeable film having a first surface and a second surface, said first substantially impermeable film comprising a plurality of holes between the first surface and the second surface;
   a second substantially gas impermeable film, and said film having a first surface and a second surface, said second substantially impermeable film comprising a plurality of holes between the first surface and the second surface;
   an adsorbent material overlaying the holes in the first and second gas impermeable films;
   a porous polyethylene terephthalate film covering the first and second substantially gas impermeable films; and
   a seal around the perimeter of the porous polyethylene terephthalate film, the seal retaining the first and second films;
   wherein said first and second plurality of holes in said first and second substantially gas impermeable films do not overlap; and
   wherein upon creation of a pressure differential in a first direction across the valve fluid communication occurs between the first and second plurality of holes, but wherein upon creation of an opposite pressure differential in a second direction across the valve fluid communication does not substantially occur between the first and second plurality of holes.

13. The one-way valve of claim 12, wherein at least one of the substantially gas impermeable films comprises PET.

14. The one-way valve of claim 12, further comprising an adhesive layer for connecting the valve to a wall of an electronic enclosure.

* * * * *